US009284206B2

(12) United States Patent
Presutti

(10) Patent No.: US 9,284,206 B2
(45) Date of Patent: Mar. 15, 2016

(54) CHEMICAL CO-PRECIPITATION PROCESS FOR RECOVERY OF FLOW-BACK WATER, PRODUCED WATER AND WASTEWATER OF SIMILAR CHARACTERISTICS

(71) Applicant: Michael Presutti, Coraopolis, PA (US)

(72) Inventor: Michael Presutti, Coraopolis, PA (US)

( * ) Notice: Subject to any disclaimer, the term of this patent is extended or adjusted under 35 U.S.C. 154(b) by 595 days.

(21) Appl. No.: 13/671,853

(22) Filed: Nov. 8, 2012

(65) Prior Publication Data
US 2014/0124453 A1 May 8, 2014

(51) Int. Cl.
*C02F 1/52* (2006.01)
*C02F 1/56* (2006.01)
*C02F 1/66* (2006.01)
(Continued)

(52) U.S. Cl.
CPC ... *C02F 9/00* (2013.01); *C02F 1/72* (2013.01); *E21B 21/063* (2013.01); *C02F 1/001* (2013.01); *C02F 1/529* (2013.01); *C02F 1/5236* (2013.01); *C02F 1/5245* (2013.01); *C02F 1/5272* (2013.01); *C02F 1/56* (2013.01); *C02F 1/66* (2013.01); *C02F 1/76* (2013.01); *C02F 2101/10* (2013.01); *C02F 2101/20* (2013.01); *C02F 2101/203* (2013.01); *C02F 2101/206* (2013.01); *C02F 2103/10* (2013.01); *C02F 2103/365* (2013.01); *C02F 2201/008* (2013.01); *C02F 2209/001* (2013.01); *C02F 2209/40* (2013.01)

(58) Field of Classification Search
CPC ... E21B 21/063; E21B 21/065; E21B 21/066; E21B 21/068; E21B 43/26; E21B 43/40; C02F 1/001; C02F 1/5236; C02F 1/5245; C02F 1/5272; C02F 1/529; C02F 1/52; C02F 1/56; C02F 1/66; C02F 1/72; C02F 2201/008; C02F 2103/10; C02F 2103/365; C02F 2209/40; C02F 2209/50
USPC ......... 210/202–207, 721, 723, 724, 758, 804, 210/806; 175/66, 206; 166/207, 308.1, 166/308.2
See application file for complete search history.

(56) References Cited

U.S. PATENT DOCUMENTS 4,363,733 A * 12/1982 Meiller et al. ................. 210/727
8,877,690 B2 * 11/2014 Keister ..................... C01D 3/06
210/638

(Continued)

OTHER PUBLICATIONS

Frohlich, Cliff, "Two-year survey comparing earthquake activity and injection-well locations in the Barnett Shale, Texas," PNAS, vol. 109, No. 35, pp. 13934-13938, Aug. 28, 2012, United States.

(Continued)

*Primary Examiner* — Joseph Drodge
(74) *Attorney, Agent, or Firm* — Cohen & Grigsby, P.C.

(57) ABSTRACT

Methods and systems for treating contaminated flow-back water produced by hydraulic fracture are provided. The method involves precipitating metals from the flow-back water stream in a first reaction using at least one oxidizing agent, at least one pH adjusting agent, a source of sulfate and carbonate ions, and at least one co-precipitation agent. The precipitated metals may be dewatered using a first filter and may be used as an additive to drilling mud. The flow-back water may be further purified in a second reaction by addition of at least one pH adjusting agent and hydrated lime to precipitate salts. The precipitated salts may be dewatered using a second filter and may be used as an accelerating additive to concrete. The purified flow-back water may be stabilized by the addition of at least one pH adjusting agent to provide a water stream that may be reused in the hydraulic fracture drilling process.

15 Claims, 7 Drawing Sheets

(51) Int. Cl.
*C02F 1/72* (2006.01)
*E21B 21/06* (2006.01)
*C02F 9/00* (2006.01)
*C02F 1/00* (2006.01)
*C02F 1/76* (2006.01)
*C02F 101/10* (2006.01)
*C02F 101/20* (2006.01)
*C02F 103/10* (2006.01)
*C02F 103/36* (2006.01)

(56) References Cited

U.S. PATENT DOCUMENTS

| | | | | |
|---|---|---|---|---|
| 2007/0102359 A1* | 5/2007 | Lombardi et al. | | 210/639 |
| 2009/0026141 A1* | 1/2009 | Robinson | | 210/665 |
| 2011/0257788 A1* | 10/2011 | Wiemers | | B01D 61/022 |
| | | | | 700/267 |
| 2011/0259761 A1* | 10/2011 | McGuire et al. | | 205/755 |
| 2012/0168364 A1* | 7/2012 | Evans | | C02F 1/5236 |
| | | | | 210/202 |
| 2012/0267315 A1* | 10/2012 | Soane et al. | | 210/714 |
| 2013/0048562 A1* | 2/2013 | Keister | | 210/638 |
| 2013/0292336 A1* | 11/2013 | Douglas, Sr. | | 210/665 |
| 2013/0313199 A1* | 11/2013 | Marcin et al. | | 210/663 |
| 2014/0353252 A1* | 12/2014 | Hester | | E21B 43/26 |
| | | | | 210/640 |

OTHER PUBLICATIONS

Warner, Nathaniel R. et al., "Geochemical evidence for possible natural migration of Marcellus Formation brineto shallow aquifers in Pennsylvania," PNAS, vol. 109, No. 30, pp. 11961-11966, Jul. 24, 2012, United States.

* cited by examiner

CHEMICAL CO-PRECIPITATION PROCESS FOR RECOVERY OF FLOW-BACK WATER, PRODUCED WATER AND WASTEWATER OF SIMILAR CHARACTERISTICS

CROSS-REFERENCE TO RELATED APPLICATIONS

Not Applicable.

STATEMENT REGARDING FEDERALLY SPONSORED RESEARCH

Not Applicable.

THE NAMES OF THE PARTIES TO A JOINT RESEARCH AGREEMENT

Not Applicable.

INCORPORATION-BY-REFERENCE OF MATERIAL ON DISC

Not Applicable.

BACKGROUND

1. Technical Field of the Invention

This invention pertains generally to methods and systems for treating wastewater, and more specifically, methods and systems for completely recycling gas well hydraulic fracture flow-back wastewaters.

2. Background of the Invention

Water is essential to the oil and gas industry. Not only is it used in large volumes during the initial drilling process to carry dirt and rock to the surface, and to cool and lubricate the drilling equipment, water is essential in hydraulic fracture. Hydraulic fracture, or fracking, is a commonly used process to maximize the extraction of underground resources such as oil and natural gas. Fluid is pumped at a high pressure into a geological formation to crack or fracture the rock structures possessing hydrocarbons. The fracture width is maintained using a proppant such as sand, ceramic, or other particulates, thus allowing hydrocarbons to flow to the surface of the well. In addition to fracturing the rock, water also serves as a transport medium for the proppant. Accordingly, the hydraulic fracture process requires millions of gallons of water per well. A single gas well in the Marcellus Shale geographic area, for example, uses an average of 100,000 gallons of water to drill the well and 5.5 million gallons of water for hydraulic fracture. If the water is transported by tanker truck with a standard carrying capacity of 5,000 gallons, it would take 1,120 one-way trips (2,240 round trips), with each tanker carrying a load of 41,700 pounds, to transport water to the drilling site. A recent count by the Carnegie Museum of Natural History (May, 2012) found that 9,848 gas wells have been drilled in the Marcellus Shale geographic area. At an average usage rate of 5.6 million gallons of water per well, that equates to 55 billion gallons of water.

After hydraulic fracture is complete, the internal pressure of the geologic formation causes the injected water to rise to the surface where it may be recovered and stored in tanks or pits prior to disposal or recycling. Recovered water, commonly referred to as produced water or flow-back water, carries with it numerous chemicals added during the hydraulic fracturing process in addition to salts (chlorides, bromides, and sulfides of calcium, magnesium, and sodium), metals (barium, manganese, iron, and strontium, among others), bacteria and hydrocarbons leached from the geologic formation. On average, seven to nine barrels of contaminated flow-back water may be generated during the production of a single barrel of natural gas. A 2009 study by the Argonne National Laboratory found that in the year 2007, at least 56 million barrels a day of contaminated wastewater were produced onshore in the U.S. as a byproduct of drilling for oil and gas. That calculates to more than 800 billion gallons per year. As the number of gas wells drilled since 2007 has increased exponentially, the amount of contaminated flow-back water has also increased.

Standard disposal options for flow-back water include discharge into surface water or underground injection. Both options pose a threat to the environment due to possible contamination of aquifers (*Geochemical evidence for possible natural migration of Marcellus Formation brine to shallow aquifers in Pennsylvania*, N. R. Warner et al., Proceedings of the National Academy of Sciences 109:11961-6, July 2012) and the risk of seismic activity (*Two-year survey comparing earthquake activity and injection-well locations in Barnett Shale, Texas*, C. Frohlich, Proceedings of the National Academy of Sciences 109:13931-8, August 2012).

Reusing untreated flow-back water for hydraulic-fracture is not viable due to the large potential these waters have in fouling or scaling underground geologic formations, as well as the pumping and drilling equipment, which then impedes the production of hydrocarbons. The flow-back water must therefore be filtered and treated before it can be reused in hydraulic fracture or reintroduced into the environment. For this reason, the flow-back water is typically trucked from the well site to a filtering location, and then trucked from the filtering location to its next destination. The process of using trucks to transport the water increases traffic volume on the roads and requires fossil fuels to power the trucks. Similarly, construction of piping systems to pump the water to and from a filtering location adds considerable expense. Once filtered and treated, a large amount of solid waste byproduct is generated which must then be trucked to landfill sites. It has been estimated that for every 100,000 gallons of flow-back water filtered and treated, 45,700 lbs. of potentially hazardous sludge is produced.

Fracturing fluids are in close contact with the geological formation during hydraulic fracture and thus pick up numerous materials from the rock. Such materials may include at least ions, metals and trace elements such as calcium, iron, magnesium, sodium, chloride, barium, mercury, arsenic, and lead. As such, typical flow-back water may contain contamination levels of salts, metals and dissolved solids (total organic and inorganic dissolved solids) that are as much as several thousand fold over the EPA's maximum allowable level.

Table 1 shows analytical data on hydraulic fracture flow-back water sampled from the Marcellus Shale geological area. Any process or system for the treatment and reuse of such flow-back water must remove the large quantity of salts and metals that act to foul the hydraulic fracture process and which are toxic to the environment. One of the most difficult (and toxic) contaminants to remediate in flow-back water from Marcellus Shale wells is barium. Water-soluble barium compounds are poisonous. At the high concentrations found in flow-back water, barium ions affect the nervous system, causing tremors, weakness, anxiety, shortness of breath and paralysis through the ion's ability to block potassium ion channels. Barium ions also affect the immune system, respiratory system, skin, and eyes, causing, for example, blindness.

TABLE 1

|  | Flowback Water Chemistry (mg/L) | EPA's Maximum Contaminant Level | Multiples of Contamination |
|---|---|---|---|
| Barium | 18,219 | 2 | 9,109× |
| Calcium | 15,580 | 1.3 | 11,984× |
| Iron | 57.5 | 0.3 | 191× |
| Magnesium | 1,139 | 1.3 | 876× |
| Strontium | 4,750 | 4 | 1,187× |
| Hardness | 43,549 | — | Extremely hard |

While not as toxic as barium, strontium does have deleterious effects on the environment at the high concentrations found in flow-back water. For example, at high uptake levels, strontium has been found to cause disruption of normal bone development, anemia and oxygen shortages, and at very high concentrations to cause cancers and damage to the genetic materials in cells.

The extremely high hardness levels of the flow-back water are indicative of high concentrations of total dissolved salts. While low levels of certain salts such as calcium and magnesium in aquifers are crucial for the growth and development of wildlife and fish in the Marcellus geologic area, high concentrations can be extremely deleterious. The effect of high-salt loads on watersheds has been extensively documented through the study of road salt effects, and aquatic ecosystem impacts can be significant and far-reaching. Beyond direct toxicity to aquatic life, salinity affects the structure and function of aquatic ecosystems. High chloride levels, for example, have been known to be associated with the invasive golden algae (*Prymnesium parvum*). A *Prymnesium* bloom was responsible for the loss of all gill-breathing organisms in 26 miles of Dunkard Creek in southwestern Pennsylvania in the fall of 2009. High bromide levels, while non-toxic salt compounds, have been shown to react with disinfectants used at municipal water treatment plants to form brominated trihalomethanes (THM) which are volatile organic liquid compounds that become part of the drinking water. Studies have demonstrated a link between ingestion of THMs and several types of cancer and birth defects.

The present invention overcomes many of the shortcomings of the prior art treatment of flow-back water by providing a cost effective process and system to recycle all of the products in flow-back water.

SUMMARY

According to its major aspects, and briefly stated, the present invention includes a method and a system for treating flow-back water using a chemical co-precipitation process that involves the use of two successive precipitation and filtration steps. The filtrate from each successive step may be increasingly purified of contaminating metals and salts and may be reused in the hydraulic fracture operation onsite or reintroduced to the environment. The solid filter cake from each filtration step may be reused in either drilling mud or drilling fluids or may be used as a concrete additive.

Thus, a first embodiment of the present invention is directed to a method for treating flow-back water by providing a volume of flow-back water; admixing an oxidizing agent with the volume of flow-back water; adding a base to adjust the pH of the flow-back water to between 7.5 and 8.5; admixing a source of sulfate ions to the volume of flow-back water; admixing a source of carbonate ions to the volume of flow-back water; admixing at least one flocculating agent to co-precipitate metal ions from the volume of flow-back water as at least one of a metal oxide, metal sulfate or metal carbonate; and removing the precipitated solids from the flow-back water to form a first treated flow-back water and a metal sludge cake.

The method may also contemplate the addition of a base to adjust the pH of the first treated flow-back water to between 6.5 and 7.5; admixing calcium hydroxide with the first treated flow-back water to adjust the pH to between 10.0 and 11.0; and removing the precipitated solids from the first treated flow-back water to form a second treated flow-back water and a synthetic gypsum precipitate. In certain embodiments, the first treated flow-back water may be further admixed with at least one flocculating agent to co-precipitate ions having at least one of an oxide or sulfate.

Additionally, the method may also contemplate adding at least one acid to the second treated flow-back water to adjust the pH to between 7.0 and 8.0. In certain embodiments, the second treated flow-back water may be contacted with carbon dioxide gas to form a re-carbonated second treated flow-back water prior to the pH adjustment by the addition of an acid.

In a preferred embodiment of the method, the oxidizing agent may be $ClO_2$, the source of sulfate ions may be $NaSO_4$ and the source of carbonate ions may be $NaCO_3$. In another preferred embodiment of the method, the at least one flocculating agent may be sodium bentonite clay, poly aluminum ferric chloride, or an anionic polymer. In still further embodiments of the method, the least one acid may be HCl and the base may be NaOH.

In preferred embodiments of the method, removing the precipitated solids from the flow-back water may be achieved by pumping the flow-back water through a first filter bag after treatment to remove the precipitated solids and generate a first treated flow-back water and a metal sludge cake. Similarly, removing the precipitated solids from the first treated flow-back water may be achieved by pumping the first treated flow-back water through a second filter bag after treatment to remove the precipitated solids and generate a second treated flow-back water and a synthetic gypsum precipitate.

In preferred embodiments of the method, the first filter may trap solid precipitants comprising at least one of FeO, $F_3O_4$, $Fe_2O_3$, MnO, $Mn_3O_4$, $Mn_2O_3$, $BaSO_4$, or $SrSO_4$, while the first filtrate or first treated flow-back water may contain at least one of calcium and sulfate. In preferred embodiments of the method, the second filter may trap a synthetic gypsum precipitate, while the pH corrected filtrate may be reused in hydraulic fracture or reintroduced to the environment.

A second embodiment of the present invention is directed to a portable system for treating flow-back water. The portable system may house a feed conduit to provide a volume of flow-back water and a volume of an oxidizing agent to a first process tank whereby both become mixed prior to entry into the first process tank. The system may also house a first process tank to contact the volume of flow-back water with at least a source of sulfate ions, carbonate ions and flocculating agents; a first filter assembly to remove precipitated metals by producing a first filter cake and a first filter flow-back water; a second process tank to contact a first filtered flow-back water with at least hydrated lime; a second filter assembly to remove synthetic gypsum by producing a second filter cake and a second filter flow-back water; a third process tank to contact the second filter flow-back water with a pH adjusting agent and produce a final treated flow-back water; and an exit conduit for the final treated flow-back water.

In preferred embodiments of the portable system, the first and second filter assemblies may be bag filters. Further, the first, second and third process tanks may be adapted to provide continuous mixing.

In a particularly preferred embodiment of the portable system, the oxidizing agent may be delivered from a feed tank which may have a pump. Further, the feed conduit may comprise a paddlewheel flow meter which measures the volume of flow-back water and sends a signal to the oxidizing agent feed tank pump to adjust the volume of oxidizing agent.

In yet further preferred embodiments of the portable system, the flocculating agents may be at least sodium bentonite clay and the first filter cake may be recycled as drilling mud or a drilling mud additive.

Additionally, the portable system may also contemplate an exit conduit which may provide treated flow-back water that is reused in hydraulic fracture or reintroduced to the environment. The source of sulfate ions may be a separate sulfate supply tank and the source of carbonate ions may be a separate carbonate supply tank. In preferred embodiments of the portable system, the exit conduit may divert some flow back to the sulfate and carbonate supply tanks.

In yet further preferred embodiments of the portable system, the pH adjusting agent at the third process tank may be a source of carbon dioxide gas.

BRIEF DESCRIPTION OF THE DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present invention, unless stated to be otherwise, are not necessarily drawn to scale.

DETAILED DESCRIPTION

Figure 1:
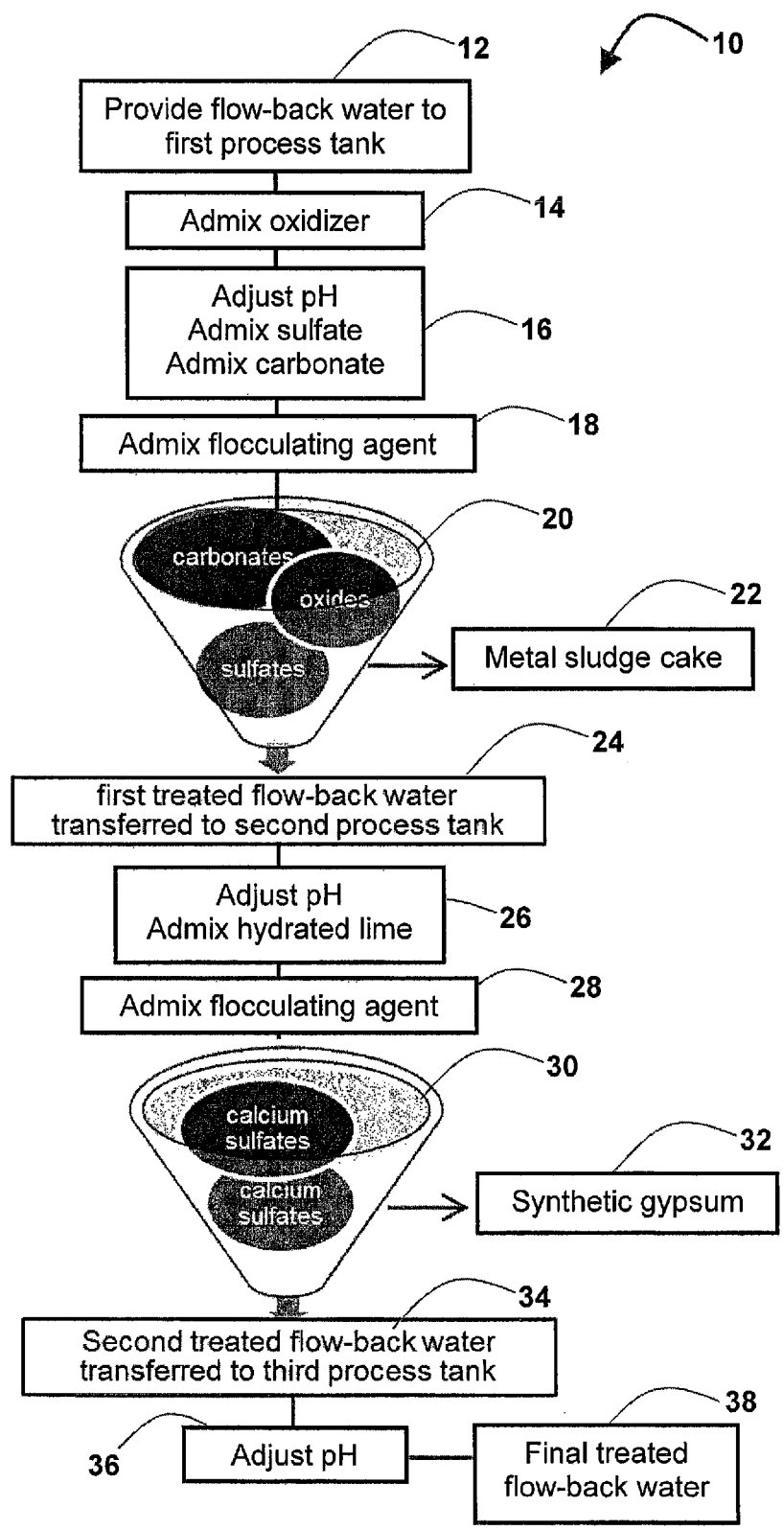
FIG. 1 depicts an exemplary flow diagram of a process for the treatment and reuse of flow-back water in accordance with certain aspects of the present invention.

In the following description, the present invention is set forth in the context of various alternative embodiments and implementations involving a process and system for the treatment and reuse of flow-back water recovered during the drilling of an oil or gas well in addition to during and after hydraulic fracture operations. The process and system allows for recovery and recycling of identified contaminating components in flow-back water: the final treated flow-back water is suitable for re-use in hydraulic fracture or reintroduction to the environment, and the total recovered solids are suitable for use as drilling mud or as additives to drilling mud and as additives to concrete.

The process and system of the present invention removes or reduces to acceptable levels the aforementioned contaminants from flow-back water and allows for their recovery and recycling into useful production materials such as drilling muds, concrete additives and de-icing or dust control products. Furthermore, the flow-back water is purified to a level such that it may be reused in hydraulic fracture or even reintroduced to the environment. According to the present invention, the process begins with the addition of contaminated water such as, for example, flow-back water to a process tank which is capable of continuous stirring, mixing or agitation. An effective amount of an oxidizing agent such as, but not limited to, chlorine dioxide may be added to the process tank. The pH of the contaminated water may be adjusted to a range from 7.0 and 9.0, preferably to a pH of about 8.0, using a base such as, for example, sodium hydroxide. At this pH, in the presence of the oxidizing agent, iron and manganese may become insoluble iron oxides and manganese oxides.

An effective amount of a source of sulfate and carbonate ions may be added to the process tank to achieve the removal of metals as insoluble sulfate and carbonate salts. This may be accomplished by the addition of an effective amount of sodium sulfate and sodium carbonate to achieve the removal of barium and strontium, for example. The precipitated oxides, sulfates and carbonates may be rapidly removed from solution by the addition of a co-precipitant or flocculating agent. Preferred flocculating agents may include any of aluminum coagulants, iron coagulants, polymers, bentonite clay, inorganic coagulants or organic coagulants. A particularly preferred flocculating agent may include at least sodium bentonite clay. Additional flocculating agents may be added such as, but not limited to, polymers and poly aluminum ferric chloride.

The precipitated particles and floc may be readily de-watered using a bag filter, for example, with little chance for clogging or blockage of the filter. As such, the treated water and flocculated solids may be pumped to a dewatering bag filter to concentrate the solids into a metal sludge cake. The metal sludge cake may be recycled on-site into drilling muds thereby eliminating the expense of hauling and landfilling as a waste product. Drilling mud or drilling fluids typically contain bentonite clay, anionic polymers and weighing agents such as barium sulfate, calcium carbonate, and iron oxide. Thus, this first precipitated floc results in an admixture which may contain all of the key ingredients normally found in a drilling mud.

The first filtrate or first treated flow-back water may be transferred or pumped to a second process tank capable of continuous stirring, mixing or agitation. This first treated flow-back water may have high concentrations of calcium and sulfates that may be reduced through additional treatment. As such, the process may further include the addition of a base such as, for example, sodium hydroxide, to adjust the pH to a range of from 6.0 to 8.0, preferably to a pH of about 7.0. An effective amount of hydrated lime may be added to the process tank to increase the pH to a range of from 9.5 and 11.5, preferably to a pH of about 10.5. The addition of the hydrated lime may form a precipitate containing calcium sulfate or synthetic gypsum.

The precipitated solids and water may be pumped to a second bag filter to concentrate the synthetic gypsum. The synthetic gypsum may be recycled as an accelerator additive to concrete as it is currently applied thereby eliminating the need to haul offsite and landfill. The second filtrate or second treated flow-back water may then be pumped to a third process tank which may be capable of continuous stirring, mixing or agitation. This tank may be further capable of providing a gas stream in the form of $CO_2$ to provide for re-carbonation of the second treated flow-back water. Further, the process may include the addition of an acid such as, for example, hydrochloric acid, to adjust the pH to a range of from 6.0 to 8.0, preferably to a pH of about 7.0.

This third treated flow-back water from the third process tank may then be combined with freshwater and reused in the drilling process or may be transported and sold as a de-icing or dust control product for the coal industry. All products produced from this process may be reused onsite.

Referring now to the drawings, an exemplary flow diagram of a process of the present invention is shown in FIG. 1 generally designated by reference numeral 10. The process begins at step 12 where a volume of flow-back water such as, for example, hydraulic fracture flow-back water, is supplied to a first process tank which receives and stores the water while it is chemically treated to convert dissolved metals into settleable or precipitatable metals. The flow-back water may be any water recovered during the drilling of an oil or gas well in addition to water recovered during or after hydraulic fracture operations or any combination thereof. The flow-back water may further include water recovered from acid mine drainage or abandoned mine drainage. An effective amount of an oxidizer is them admixed into the volume of flow-back water in the first process tank at step 14. The oxidizer may be any agent known in the art which is capable of forming insoluble metal oxides with metals such as, for example, iron and manganese. Exemplary oxidizing agents may include dissolved oxygen such as via aeration, chlorine compounds such as chlorine dioxide, and potassium permanganate. In preferred embodiments, the oxidizing agent is chlorine dioxide.

The flow-back water in the first process tank may then be adjusted to a pH ranging from 7.0 to 9.0, preferably to a pH of about 8.0, as shown at step 16. This may be accomplished by the addition of a base such as, for example, sodium hydroxide. At this pH, in the presence of the oxidizing agent, metal oxides may become insoluble precipitates such as, for example, ferric hydroxide and manganese dioxide. Step 16 further indicates the addition of an effective amount of a source of sulfate ions and a source of carbonate ions such as, but not limited to, sodium sulfate and sodium carbonate. This later addition may aid in the formation of sulfates and carbonates of several metal contaminates such as barium, strontium, calcium, and magnesium. In certain embodiments, sulfate ions in the form of sodium sulfate may be added in excess to ensure the full removal of barium and strontium as the precipitatable metal salts barium sulfate and strontium sulfate.

The precipitated oxides, sulfates and carbonates may be rapidly removed from solution by the addition of a co-precipitant or flocculating agent as shown at step 18. Flocculating agents include any compound which may act to bring together fine particles to form a dense precipitant or precipitatable floc. Preferred flocculating agents may include any of aluminum coagulants, iron coagulants, polymers, bentonite clay, inorganic coagulants or organic coagulants. A particularly preferred flocculating agent may include at least sodium bentonite clay or the Ciba® Magnafloc®. Bentonite clay attracts cationic molecules and metallic ions to form larger masses. Thus, bentonite clay may be useful in co-precipitating sulfates, phosphates, metals, particularly heavy metals, and organic compounds from the flow-back water. The clay particles in solution may provide increased opportunity for particle collisions resulting in the rapid formation of a precipitatable floc. The resulting floc may be a complex mixture of encapsulated contaminants and clay solids held together by Van der Waals and electrostatic forces. The contaminants may thus become microencapsulated and surrounded by a barrier of clay particles making them nonreactive to external leaching.

Additional flocculating agents may be added at step 18 such as, but not limited to, polymers and poly aluminum ferric chloride. A polymer, for example, may be composed of compact, coiled molecules which, when combined with an appropriate fluid such as flow-back water, may become uncoiled and extend to expose positively and negatively charged sites. These uncoiled polymer molecules can be extremely long, having millions of sites which attract charged particles suspended in the flow-back water. Since a large number of the particles suspended in the flow-back may carry a negative or positive electrostatic charge, these particles may tend to aggregate with the polymer molecules to form flocs.

The encapsulated particles and floc containing the oxides, sulfates and carbonates may be readily de-watered using a filter as shown at step 20. The filter may be any filter known in the art such as, for example, membrane filters, belt filters, bio-filters, bag filters, or sand filters. In preferred embodiments, the filter used at step 20 may be a bag filter. As such, the first treated flow-back water and flocculated solids may be pumped to a dewatering bag filter to concentrate the solids into a metal sludge cake. The metal sludge cake may be removed from the first filter bag at step 22 and recycled on-site into drilling muds or may be transported in the filter bag to other drilling sites for use as a drilling mud or drilling mud additive. Drilling mud or drilling fluids typically contain bentonite clay, anionic polymers and weighing agents such as barium sulfate, calcium carbonate, and iron oxide. Thus, this first precipitated floc results in an admixture which may contain all of the key ingredients normally found in a drilling mud. Thus, this process eliminates the expense of hauling and landfilling the precipitated materials as a waste product and rather recycles them into a useful manufacturing product.

The first filtrate or first treated flow-back water may then be transferred or pumped to a second process tank as shown at step 24. This first treated flow-back water may have high concentrations of calcium and sulfates that may be reduced through additional treatment. As such, the process may further include the addition of a base as shown at step 26. In embodiments, a base such as sodium hydroxide may be used to adjust the pH to ranging from 6.0 to 8.0, preferably to a pH of about 7.0. Additionally, step 26 may also include admixing an effective amount of hydrated lime to increase the pH to a range of from 9.5 and 11.5, preferably to a pH of about 10.5. The addition of the hydrated lime may form a precipitate containing calcium sulfate or synthetic gypsum. As shown at step 28, additional flocculating agents such as, for example, a polymer or sodium bentonite clay or the Ciba® MagnaFloc® may be admixed in the second process tank to aide in the rapid removal of the synthetic gypsum and increase the speed of filtration.

The precipitated solids and water may be pumped to a second bag filter, as shown at step 30, to concentrate the synthetic gypsum. Step 32 shows that the concentrated synthetic gypsum may be removed from the second filter bag and recycled as an accelerator additive to concrete as it is currently applied. This eliminates the need to haul additional waste offsite and landfill. For example, the synthetic gypsum generated from the treatment of the flow-back water from one gas well may be used in the concrete which forms the pad and caissons for a second gas well.

The second filtrate or second treated flow-back water may then be pumped to a third process tank, as shown at step 34. The process may include adjusting the pH to near neutral, as shown at step 36, using a gas stream in the form of $CO_2$. For example, the pH of the second treated flow-back water may be adjusted to a pH ranging from 6.0 to 9.0 using re-carbonation by the $CO_2$ stream. A final pH adjustment may be made using an acid such as, for example, hydrochloric acid, to adjust the pH to a range of from 6.0 to 8.0, preferably to a pH of about 7.0.

The final treated flow-back water may then be removed, as shown at step 38, and either used directly in the drilling process or combined with freshwater for reuse. Furthermore, this final treated flow-back water may be of high enough purity for reintroduction to the environment. As such, all products produced from this process may be reused onsite leading to a great reduction in overall cost. Alternatively, the final products may be transported and sold to other industries drilling muds or drilling mud additives, as concrete additives and as a dust control products for the coal industry.

In an alternate embodiment of the process, the first filtrate or first treated flow-back water may be transferred or pumped to a second process tank as shown at step 24. A base such as sodium hydroxide may be used to adjust the pH to a range of from 6.0 to 8.0, preferably to a pH of about 7.0, as shown at step 26. In this alternative embodiment, hydrated lime is not added at step 26. Rather, the existing calcium remaining in solution may react with free sulfate ions remaining in solution to form synthetic gypsum. As shown at step 28, additional flocculating agents may be admixed in the second process tank to aide in the rapid removal of the synthetic gypsum and increase the efficiency of filtration. The precipitated solids and water may be pumped to a second bag filter, as shown at step 30, to concentrate the synthetic gypsum. Step 32 shows that the concentrated synthetic gypsum may be removed from the second filter bag and recycled as an accelerator additive to concrete. The second filtrate or second treated flow-back water may then be pumped to a third process tank, as shown at step 34. The process may include adjusting the pH to neutral, as shown at step 36. This step may be achieved by the addition of an acid such as, for example, hydrochloric acid, to adjust the pH to ranging from 6.0 to 8.0, preferably to a pH of about 7.0. The water from this final may be of useful as a deicer for roads onsite or may be sold to other industries for de-icing or salt recovery purposes.

Figure 2:
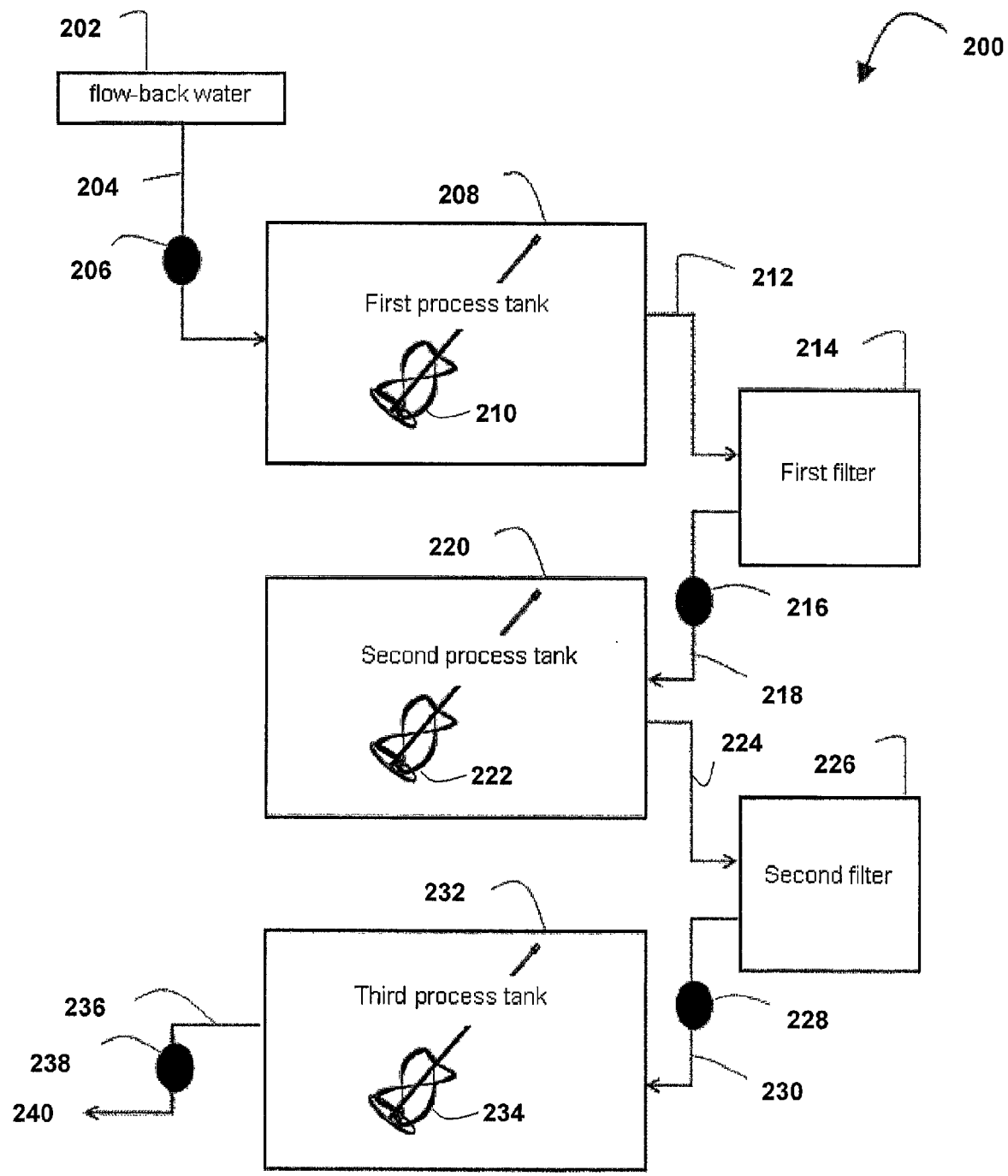
FIG. 2 illustrates a schematic diagram of a system for the treatment and reuse of flow-back water in accordance with certain embodiments of the present invention.

Referring now to FIGS. 2-7, embodiments of a system of the present invention are shown generally designated by the reference numeral 200. A schematic diagram of the system 200 for the chemical co-precipitation process for recovery of flow-back water is shown in FIG. 2. Flow-back water, which may be contained in a frac tank 202, may be supplied to a first process tank 208 by truck or by pipeline 204 or by any means known in the art. Alternatively, the flow-back water may be contained in a pond or pool or may be collected using conduits linked directly to the well source or in terrain near the well source. In such an embodiment, pipeline 204 may be part of the conduit used to collect the flow-back water from the well source. In embodiments which utilize a pipeline 204, a pump 206 may be operated to drive the flow-back water to the first process tank 208. Further, shutoff valves may be used to control the volume of fluid in the first process tank 208. The first process tank 208 may have a mixer 210 or may be adapter to allow continuous stirring, mixing or agitation using any method known in the art for interspersing several components. The first process tank 208 may further by adapted to allow for addition of several chemical components such as, but not limited to, at least one oxidizer, at least one pH adjusting agent, at least one source of sulfate ions, at least one source of carbonate ions, and at least one flocculating agent.

The first reaction tank 208 may be further fitted with an outlet pipe 212 which is in fluid communication with a first filter 214. The first filter may be any filter known in the art such as, for example, membrane filters, belt filters, bio-filters, bag filters, or sand filters. In a preferred embodiment, the first filter 214 may be a bag filter. A second reaction tank 220 may be adapted to receive a filtrate from the first filter 214 via a pipeline 218. The filtrate may be conducted to the second reaction tank 220 more rapidly using a pump 216. The dewatered solid material may be removed from the first filter 214 and used as a drilling mud or as an additive to drilling muds or fluids onsite.

The second process tank 220 may have a mixer 222 or may be adapted to allow continuous stirring, mixing or agitation using any method known in the art for interspersing several components. The second reaction tank 220 may be further adapted to allow the addition of several chemical components such as, but not limited to, at least one pH adjusting agent, hydrated lime, and at least one flocculating agent.

The second reaction tank 220 may be further fitted with an outlet pipe 224 which is in fluid communication with a second filter 226. The second filter may be any filter known in the art such as, for example, membrane filters, belt filters, bio-filters, bag filters, or sand filters. In a preferred embodiment, the second filter 226 may be a bag filter. A third reaction tank 232 may be adapted to receive a filtrate from the second filter 226 via a pipeline 230. The filtrate may be conducted to the third reaction tank 232 more rapidly using a pump 228. The dewatered solid material may be removed from the second filter 226 and used as an additive to concrete such as, for example, a concrete accelerant.

The third process tank 232 may have a mixer 234 or may be adapted to allow continuous stirring, mixing or agitation using any method known in the art for interspersing several components. The third reaction tank 232 may be further adapted to allow the addition of several chemical components such as, but not limited to, at least one pH adjusting agent, and may be further capable of providing a gas stream in the form of $CO_2$. This third reaction tank 232 may be fitted with an outlet pipe 236 and 240 that may further have a pump 238 inline which may aid removal of the purified fluids from the tank.

Figure 3:
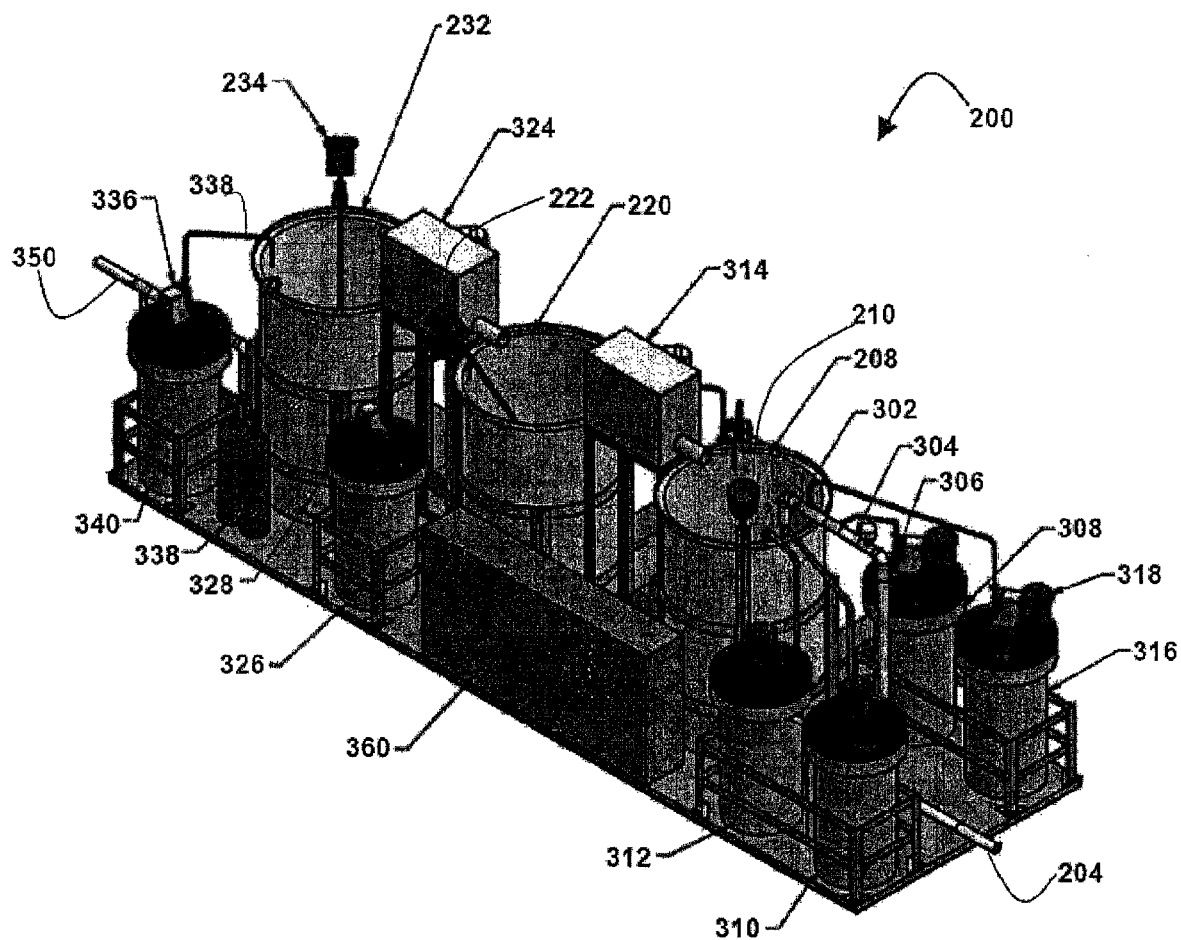
FIG. 3 illustrates a partial top view of a system for the treatment and reuse of flow-back water in accordance with certain embodiments of the present invention.

A top view of an embodiment of the system 200 of the present invention is shown in FIG. 3. Flow-back water may be provided to the system through a feed pipeline 204 which may be in fluid communication with the first process tank 208. A mixer 302 such as, for example, a static mixer in addition to a paddlewheel flow meter 304 may be included in-line with the feed pipeline 204. The feed pipeline 204 may also be adapted to accept a supply of an oxidizing agent such as chlorine dioxide from a drum 308 at a point between the paddlewheel flow meter 304 and the mixer 302. A pump 306 may aid in delivery of the oxidizing agent to the first process tank 208 via the feed pipeline 204 and may further receive signals from the paddlewheel flow meter 304 indicative of the volume of flow-back water flowing into the first process tank 208. These signals may allow the pump 306 to adjust the amount of oxidizing agent added to the first process tank 208. As such, a constant ratio of oxidizing agent may be mixed into the flow-back water by the mixer 302 before the flow-back water reaches the first process tank 208.

Figure 4:
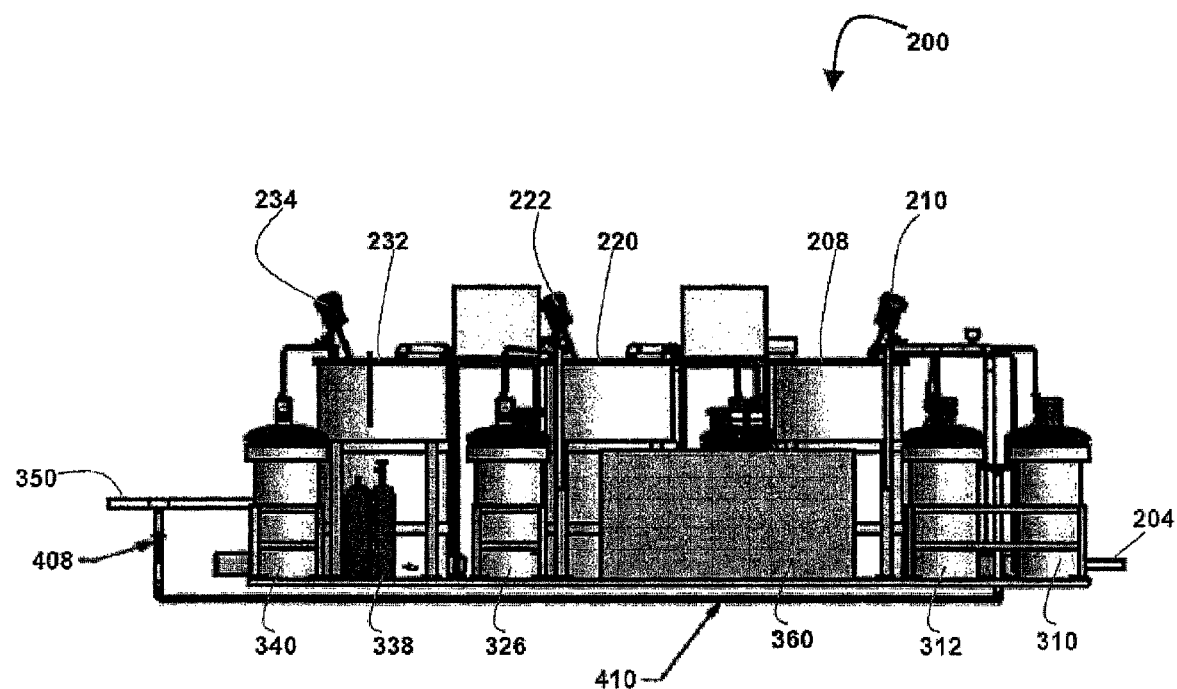
FIG. 4 illustrates a side view of a system for the treatment and reuse of flow-back water in accordance with certain embodiments of the present invention.

The first process tank 208 may be fitted with a mixer 210, in addition to several feed tubes which supply various other chemical components from various other containers. For example, the first process tank 208 may be adapted to accept a supply of sodium sulfate from a drum 310 and sodium carbonate from a drum 312 via pipelines. In embodiments, both the sodium sulfate drum 310 and the sodium carbonate drum 312 are connected to a supply of freshwater via pipeline 410, as shown in FIG. 4, to aid in delivery of these components to the first process tank 208. The first process tank 208 may be further adapted to accept flocculating agents such as bentonite clay from a feeder 314 and poly aluminum ferric chloride from a drum 316 fitted with an agitator 318.

A second process tank 220 may be in fluid communication with a filtrate from the first process tank via pipeline and a filter (not shown). The second process tank 220 may be fitted with a mixer 222 in addition to several feed tubes which supply various chemical components from various containers. For example, the second process tank 220 may be adapted to accept a supply of lime from a feeder 324 and a source of a flocculating agent from a drum 326 fitted with a pump 328.

A third process tank 232 may be in fluid communication with a filtrate from the second process tank via pipeline and a filter (not shown). The third process tank 232 may be fitted with a mixer 234 in addition to several feed tubes which supply various chemical components. For example, the third process tank 232 may be adapted to accept a supply of acid such as hydrochloric acid from tank 340 fitted with a pump 336 and may be further adapted to accept a gas stream such as $CO_2$ gas from gas tanks 338. The final treated flow-back water may exit the system via a pipeline 350. The entire system may be controlled from a central control panel 360 which may regulate reaction times in the various process tanks as well as the amounts and timing of the various chemical components added to each process tank.

A side view of an embodiment of the system 200 of the present invention is shown in FIG. 4. Like features are shown for reference. The inlet pipeline 204 and the outlet pipeline 350 are shown, as well as the location of the three process tanks 208, 220, and 232. In embodiments, a pipeline 410 with a shut-off valve 408 may be provided which redirects freshwater or a portion of the final treated flow-back water from the outlet valve 350 to the sodium sulfate 310 and sodium carbonate 312 tanks. This may allow re-use of the treated flow-back water to provide mixing of certain chemical components in the co-precipitation process.

Figure 5:
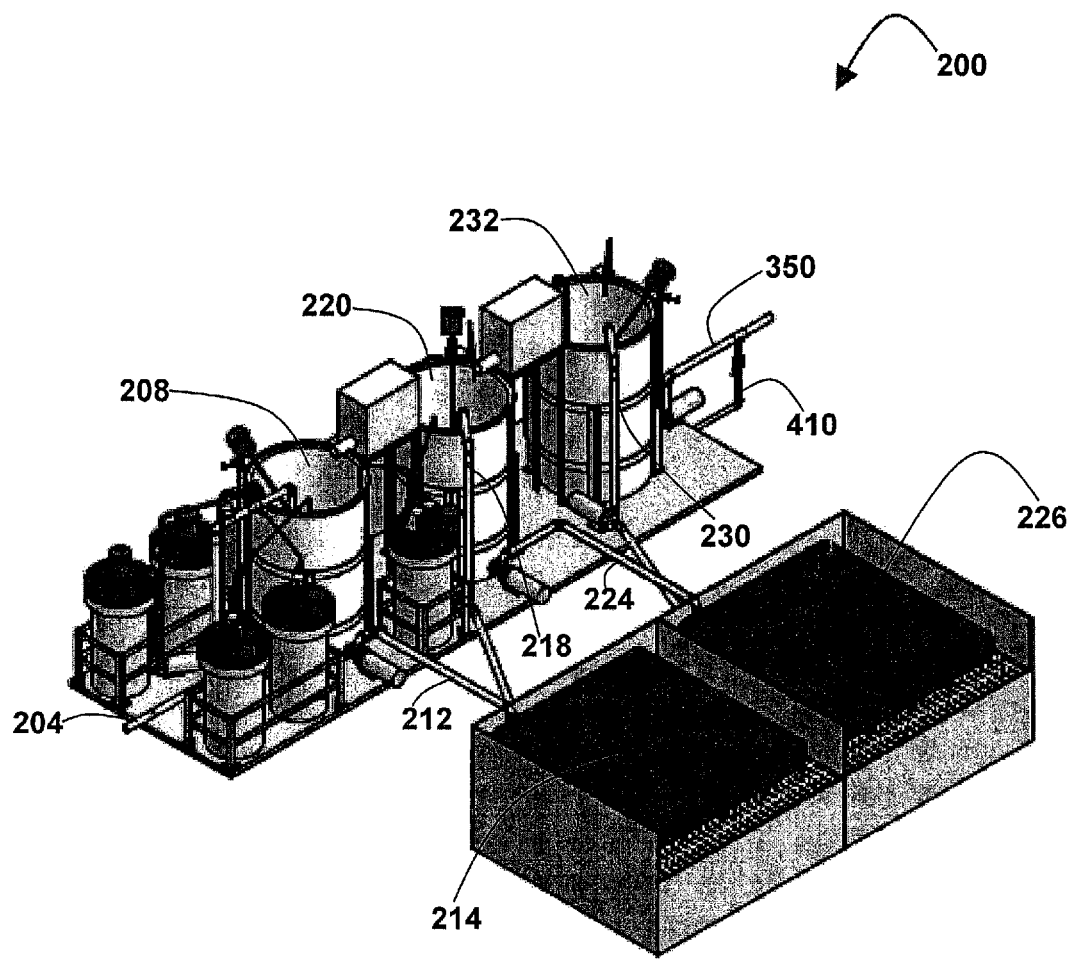
FIG. 5 illustrates a top view of a system for the treatment and reuse of flow-back water including filtration units in accordance with certain embodiments of the present invention.

A top view of an embodiment of the system 200 of the present invention is shown in FIG. 5. Again, like features are shown for reference. A first filter 214 and a second filter 226 are shown to be in fluid communication with the process tanks via pipelines. More specifically, the first filter unit 214 may accept a first treated flow-back water from the first process tank 208 via a pipeline 212. The filtrate from this first filter 214 may be passed to a second process tank 220 via a pipeline 218 with the aid of a pump (not shown). The filtrate from the first filter may be treated in the second process tank 220 and passed to a second filter 226 via a pipeline 224. The filtrate from this second filter 226 may be passed to a third process tank 232 via a pipeline 230 with the aid of a pump 228. The first filter 214 and the second filter 226 may be mobile units or they may be stationary units that are built onsite.

Figure 6:
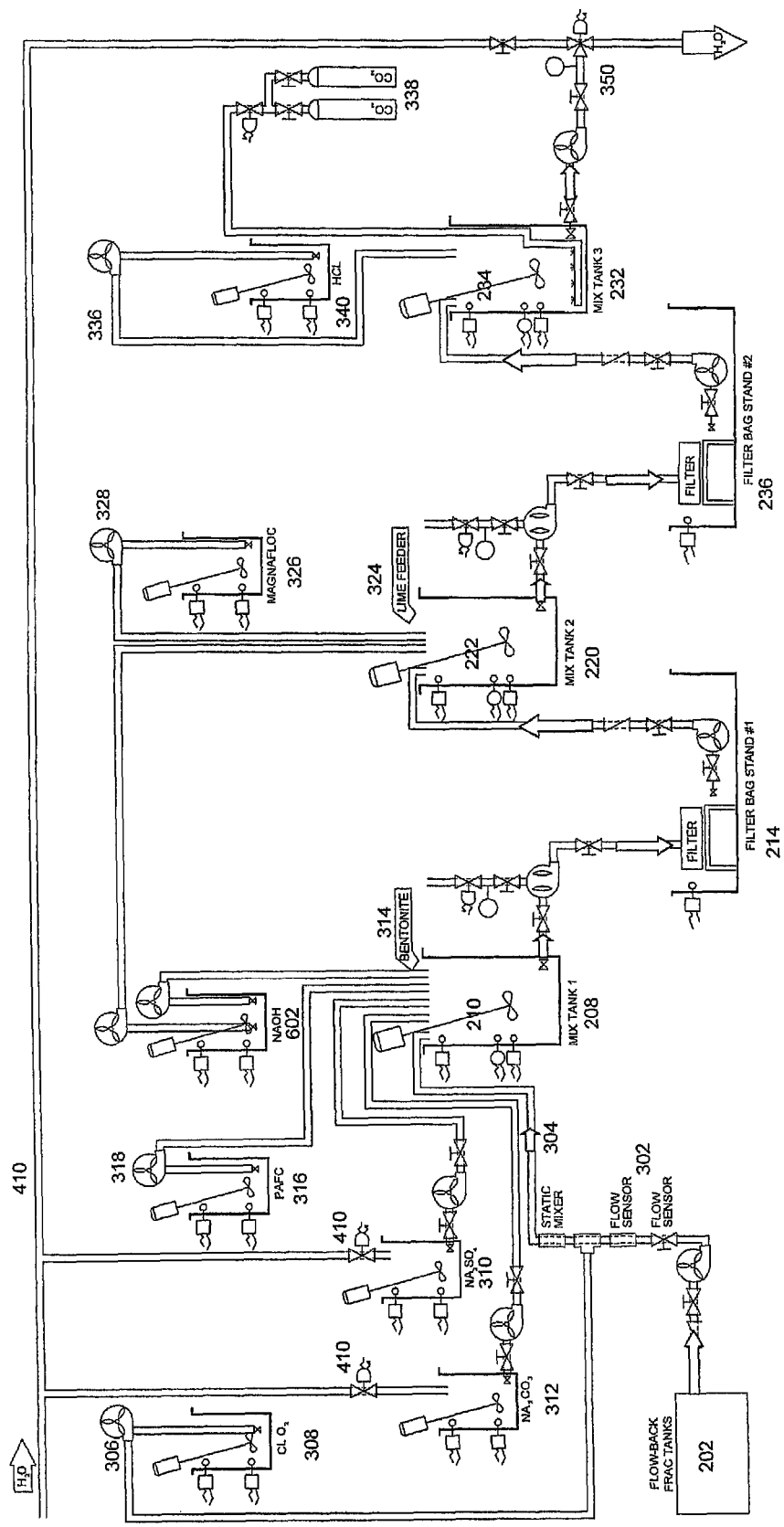
FIG. 6 illustrates a schematic diagram of a system for the treatment and reuse of flow-back water in accordance with certain embodiments of the present invention.

A detailed schematic diagram of a system for the chemical co-precipitation process for recovery of flow-back water is shown in FIG. 6. Like features are shown and labeled for reference, such as the process tanks (208, 220 and 232), and filter units (241 and 226). Arrows indicate the direction of movement of the flow-back water from the first storage frac tank 202 through each of the pipelines and pumps through the system to the exit pipeline 350. Each of the chemical components is as previously described but shown here in more detail. The base used to adjust the pH in the first and second process tanks (208 and 220) may be supplied from a single tank as is show here by the NaOH tank 602. This base supply tank 602 may supply more than one supply pipeline each having a pump to supply base to more than one process tank.

Figure 7:
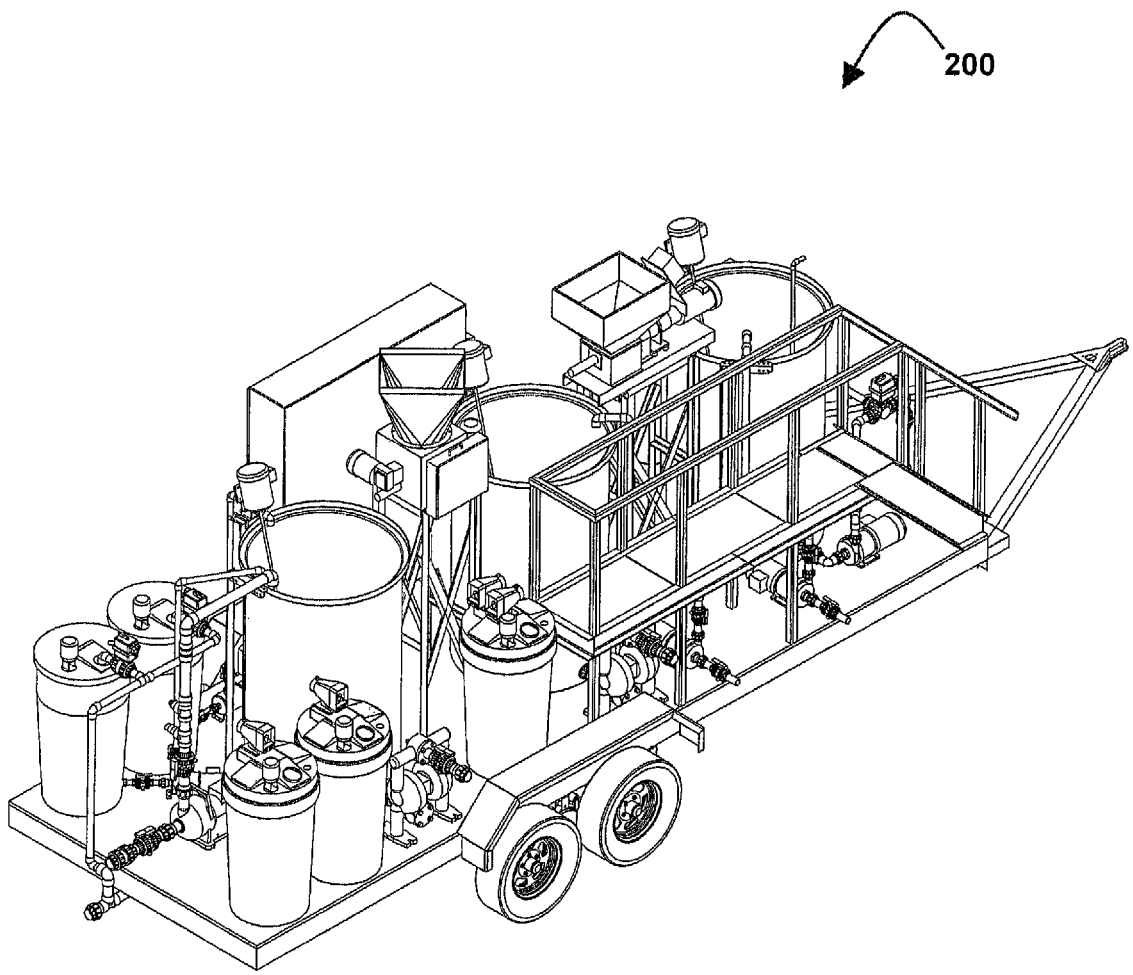
FIG. 7 illustrates top view of a mobile system for the treatment and reuse of flow-back water in accordance with certain embodiments of the present invention.

An embodiment of the system of the present invention which has been skid mounted on a single platform is shown in FIG. 7. Such an embodiment may be confined within a mobile container module that may be easily transported from well site to well site. In the embodiment shown, the process tanks may be 250 gallons each for example and reaction times may be about 10 to 20 minutes per process tank. Filtration rates of 50 gallons per minute may be achieved through each of the two bag filters allowing for a total process time of less than an hour per 250 gallons of flow-back water.

Embodiments of the system of the present invention may also be capable of processing 0.5 to 1 million gallons of water per day. For example, processing tanks 208, 220 and 232 may be frac tanks with a volume capacity of 20,000 gallons each. Frac tanks are fully mobile and may be delivered to a well site and removed from a well site with ease. Each processing tank (208, 220 and 232) may be adapted as described above to accept various chemical inputs and to provide continuous mixing. Furthermore, embodiments of the system of the present invention may include more than one first processing tank 208, more than one second processing tank 220, and more than one third processing tank 232. Each processing tank may be adapted as described above to accept various chemical inputs and to provide continuous mixing.

Furthermore, in embodiments of the present invention configured with multiple first, second, and third process tanks (208, 220 and 232), only one of each may be adapted as described above to accept various chemical inputs. The additional process tanks may provide added volume and mixing for the chemical reactions that have been initiated in the first set of tanks. As such, the first processing tank 208 may actually be two or more frac tanks linked together by pipelines that provide fluid communication and mixing between tanks. In such an embodiment, only the first tank in the set of frac tanks that makes up the first processing tank 208 may be adapted as described above to accept various chemical inputs. In a similar fashion, only the first tank in the set of frac tanks that makes up the second processing tank 220 may be adapted as described above to accept various chemical inputs and only the first tank in the set of frac tanks that makes up the third processing tank 232 may be adapted as described above to accept various chemical inputs.

EXAMPLES

The process and system described with reference to FIGS. 1-7 were used on several different hydraulic fracture flow-back water samples from the Marcellus Shale geological region. Treatment results for these samples are shown in TABLES 2-5 below.

Table 2 shows results for a sample of Marcellus Shale flow-back water that was treated using the process and system of the present invention. Chlorine dioxide was mixed with a sample of flow-back water in a first process tank to a final concentration of 1% (v/v of 110 ppm solution). The pH of the flow-back water was adjusted to 8.0 using sodium hydroxide. Sodium sulfate was added from a stock solution of 0.25 g/ml to a final of 10% (v/v) and sodium carbonate was added from a stock solution of 0.065 g/ml to a final of 10% (v/v). Sodium bentonite clay was added to a final concentration of 0.025 lbs./gallon and poly aluminum ferric chloride was added to a final concentration of 0.2% (v/v). This material reacted rapidly to form a filterable floc which was then pushed through a bag filter at 50 gallons/minute. The first filtrate was then pumped to a second process tank where the pH was adjusted 7.0 with sodium hydroxide. Hydrated lime was added to a final concentration of 0.042 lbs./gallon. Ciba® Magnafloc® 351 was added at 1.1 gram/gallon. The precipitated solids and water were pumped to a second bag filter at a rate of 50 gallons/minute. The second filtrate was then be pumped to a third process tank where it was contacted with $CO_2$ to provide for re-carbonation and hydrochloric acid to adjust the pH to 7.0.

TABLE 2

| | Flow-back water (mg/l) | First treated flow-back (mg/l) | Final treated flow-back (mg/l) | % removal |
|---|---|---|---|---|
| Barium | 18,219 | 18 | 0.95 | 100% |
| Calcium | 15,580 | 12,130 | 8,555 | 45% |
| Iron | 57.5 | <0.05 | — | 100% |
| Magnesium | 1,139 | 11.9 | 24.5 | 98% |
| Strontium | 4,750 | 988 | 419 | 91% |
| Hardness | 43,549 | 30,338 | 21,463 | 51% |

The sample was analyzed for metals using EPA method 1311, 6010B, and 7470A. As can be seen in Table 2, Barium, Iron, Magnesium and Strontium levels have all been either completely eliminated or significantly reduced in the final treated flow-back water.

Table 3 shows results for the first first-treated flow-back water samples admixed with different amounts of sodium carbonate (sample A was admixed with 5 g/l sodium carbonate; sample B was admixed with 7 g/l sodium carbonate).

Table 4 shows that the barium metal has been precipitated in the first process tank and collected in the first filter bag or first filter cake. The material from this first filter cake may be reused as drilling mud or as an additive to drilling muds or fluids. The Toxicity Characteristics Leaching Procedure (TCLP) is a soil sample extraction method for chemical analysis which is employed to determine if a waste is characteristically hazardous and indicates that while both samples contain high levels of Barium, the TCLP is extremely low for each.

TABLE 3

| | Flow-back water (mg/l) | First treated flow-back sample A (mg/l) | % removal | First treated flow-back sample B (mg/l) | % removal |
|---|---|---|---|---|---|
| Barium | 15,280 | 1.4 | 100% | 0.36 | 100% |
| Calcium | 13,220 | 5,750 | 56% | 6,200 | 53% |
| Iron | 91.7 | <0.05 | 100% | <0.05 | 100% |
| Strontium | 5,120 | 237 | 95% | 253 | 95% |
| Hardness | 37,590 | 16,750 | 55% | 16972 | 55% |

TABLE 4

| | Drilling Mud Sample A | | Drilling Mud Sample B | |
|---|---|---|---|---|
| | Chemistry (mg/L) | TCLP | Chemistry (mg/L) | TCLP |
| Arsenic | <1.0 | <.01 | <1.0 | <.01 |
| Barium | 10614 | 0.83 | 11589 | 15.2 |
| Cadmium | <2 | <.01 | <2 | <.01 |
| Chromium | <5 | <.01 | 6.6 | <.01 |
| Copper | <5 | <.01 | <5 | <.01 |
| Lead | <5 | <.01 | <5 | <.01 |
| Mercury | <.05 | <.005 | <.05 | <.005 |
| Nickel | <5 | <.01 | <5 | <.01 |
| Selenium | <1.0 | <.1 | <1.0 | <.1 |
| Silver | <3 | 0.01 | <3 | <0.01 |
| Zinc | <5 | 0.22 | 12 | <0.1 |

TABLE 5

| | Concrete Additive Sample | |
|---|---|---|
| | Chemistry (mg/L) | TCLP |
| Arsenic | <1.0 | <0.01 |
| Barium | 542 | 4.03 |
| Cadmium | <2 | <0.01 |
| Chromium | <5 | <0.01 |
| Copper | <5 | <0.01 |
| Lead | <5 | 0.01 |
| Mercury | <0.05 | <0.005 |
| Nickel | <5 | <.01 |
| Selenium | <2 | <0.1 |
| Silver | <3 | <0.01 |
| Zinc | <5 | <0.1 |

Various aspects of the chemical co-precipitation process and system have been illustrated with reference to one or more exemplary implementations. The term "effective amount" as used herein, refers to a sufficient amount of reagent to precipitate out the various chemical constituents in the flow-back water. Unless otherwise indicated, any and all numbers expressing quantities, chemical properties, concentrations, temperatures, weight and other such numerical data are to be understood as being prefaced in all cases by the term "about", unless otherwise specifically noted. In addition, the steps of methods disclosed and claimed herein do not impose a specific order on the performance of these steps, unless a particular order is expressly indicated in the specification.

When referring to concentrations of contaminants or components in water, treated or untreated, or to properties of water such as pH or viscosity, unless otherwise indicated, those concentrations or numerical values shall refer to the results of the analytical testing of a typical sample taken and analyzed by accepted laboratory methods and procedures currently used in the industry.

The previous description is provided to enable any person skilled in the art to practice the various exemplary implementations described herein. It will be appreciated that the aforementioned embodiments and implementations are illustrative and various aspects of the invention may have applicability beyond the specifically described contexts. Furthermore, it is to be understood that these embodiments and implementations are not limited to the particular components, methodologies, or protocols described, as these may vary. The terminology used in the description is for the purpose of illustrating the particular versions or embodiments only, and is not intended to limit their scope in the present disclosure which will be limited only by the appended claims.

What is claimed is:
1. A method for treating a flow-back water, the method comprising:
  providing a volume of flow-back water;
  admixing an oxidizing agent with the volume of flow-back water and adjusting a pH of the volume of flow-back water by adding a base, wherein the pH is adjusted to between 7.5 and 8.5, wherein the oxidizing agent reacts with one or more metal ions in the volume of flow-back water to form a metal oxide;

admixing a source of sulfate ions and a source of carbonate ions with the volume of flow-back water, wherein the sulfate ions and/or the carbonate ions react with one or more metal ions in the volume of flow-back water to form at least one of a metal-sulfate or a metal-carbonate;

after the previous steps, admixing at least one flocculating agent with the volume of flow-back water to form a first precipitate comprising at least one of the metal oxide, the metal sulfate, or the metal carbonate attached to or encapsulated within the at least one flocculating agent; and removing the first precipitate from the volume of flow-back water to form a first treated flow-back water and a metal sludge cake.

2. The method according to claim 1, further comprising:
adjusting a pH of the first treated flow-back water by adding a base, wherein the pH is adjusted to between 6.5 and 7.5;
admixing calcium hydroxide with the first treated flow-back water to adjust the pH of the first-treated flow-back water to between 10.0 and 11.0; and
removing a second precipitate from the first treated flow-back water to form a second treated flow-back water and a synthetic gypsum precipitate.

3. The method according to claim 2, further comprising:
adding at least one acid to the second treated flow-back water to adjust a pH of the second treated flow-back water to between 7.0 and 8.0.

4. The method according to claim 3, further comprising:
contacting the second treated flow-back water with carbon dioxide gas to form a re-carbonated second treated flow-back water.

5. The method according to claim 3, wherein the at least one acid comprises HCl.

6. The method according to claim 2, further comprising:
admixing at least one second flocculating agent with the first treated flow-back water, wherein at least one of the metal-oxide, the metal-sulfate, or the metal-carbonate is precipitated into the second precipitate.

7. The method according to claim 2, wherein removing the second precipitate comprises pumping the first treated flow-back water through a second filter bag.

8. The method according to claim 1, wherein the oxidizing agent comprises $ClO_2$.

9. The method according to claim 1, wherein the source of sulfate ions comprises $NaSO_4$ and the source of carbonate ions comprises $NaCO_3$.

10. The method according to claim 1, wherein the at least one flocculating agent comprises sodium bentonite clay, poly aluminum ferric chloride, or an anionic polymer.

11. The method according to claim 1, wherein removing the first precipitate comprises pumping the volume of flow-back water through a first filter bag.

12. The method according to claim 1, wherein the flow-back water comprises at least one of calcium, barium, strontium, iron, manganese, or magnesium.

13. The method according to claim 1, wherein the metal sludge cake comprises at least one of FeO, $F_3O_4$, $Fe_2O_3$, MnO, $Mn_3O_4$, $Mn_2O_3$, $BaSO_4$, or $SrSO_4$.

14. A method for treating a flow-back water, comprising:
providing a volume of flow-back water;
admixing an oxidizing agent comprising chlorine dioxide with the volume of flow-back water;
adding a base to the volume of flow-back water to adjust a pH of the flow-back water to about 8.0;
admixing a source of sulfate ions and a source of carbonate ions with the volume of flow-back water;
after the previous steps, admixing a flocculating agent with the volume of flow-back water to form a first precipitate comprising at least one of a metal oxide, a metal sulfate, or a metal carbonate, wherein the flocculating agent comprises sodium bentonite clay, poly aluminum ferric chloride and a polymer;
removing the first precipitate from the flow-back water to form a first treated flow-back water and a metal sludge cake;
adding a base to the first treated flow-back water to adjust a pH of the first treated flow-back water to about 7.0;
admixing calcium hydroxide with the first treated flow-back water to adjust the pH to about 10.5;
after admixing the calcium hydroxide, removing a second precipitated solids from the first treated flow-back water to form a second treated flow-back water and a synthetic gypsum precipitate; and
adding an acid to the second treated flow-back water to adjust a pH of the second treated flow-back water to between 7.0 and 8.0.

15. The method according to claim 14, further comprising:
contacting the second treated flow-back water with carbon dioxide gas to form a re-carbonate second treated water.

* * * * *